C. CROOK.
Reaping and Mowing Machine.
No. 17,205.
Patented May 5, 1857.
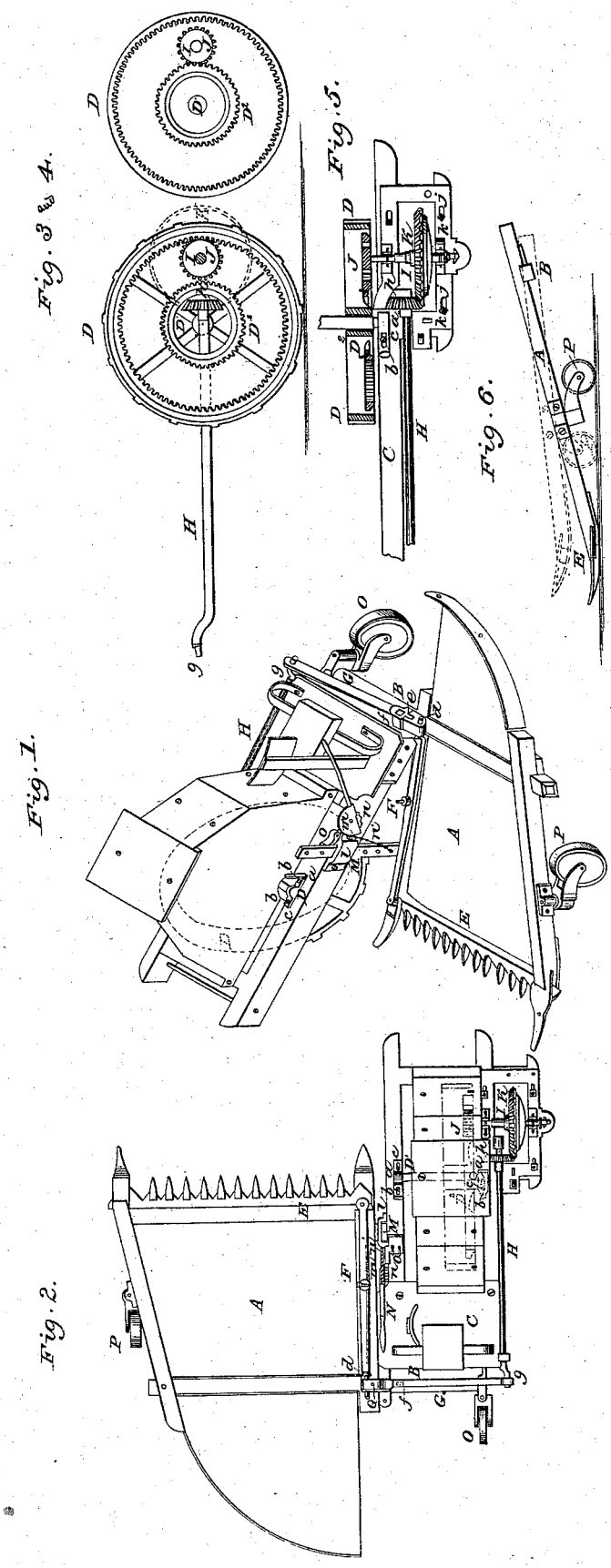

UNITED STATES PATENT OFFICE.

CHAS. CROOK, OF NEW HOPE, PENNSYLVANIA.

IMPROVEMENT IN REAPING AND MOWING MACHINES.

Specification forming part of Letters Patent No. 17,205, dated May 5, 1857.

*To all whom it may concern:*

Be it known that I, CHARLES CROOK, of New Hope, Bucks county, Pennsylvania, have invented a new and useful Improvement in Reaping and Mowing Machines; and I do hereby declare that the following is a full, clear, and exact description of the same, reference being had to the accompanying drawings, forming part of this specification, in which—

Figure 1 is a perspective view of a reaping and mowing machine; Fig. 2, a plan of the same; Figs. 3 and 4, near side views, showing more fully my improvements; Fig. 5, a broken horizontal section, and Fig. 6 an off-side view of the machine.

Similar letters of reference in each of the several figures indicate corresponding parts.

The nature of my invention consists in employing an adjustable pinion between and in combination with the teeth of the internally-geared driving-wheel and the teeth of a spur-wheel on the axle of the driving-wheel, whereby the machine can be quickly geared so as to be adapted either for mowing grass or cutting grain.

To enable others skilled in the art to make and use my invention, I will proceed to describe its construction and operation.

A represents the platform, attached near its rear end by a turning shaft, B, to the rear end of the frame C, so that its weight shall rest on the frame and not on the tongue, and thus prevent strain upon the horse's neck.

D is the driving and propelling wheel. Its shaft D' rests on the forward part of the frame C, and turns in boxes $a\,a$, which are adjustable by set-screws $b\,b$ and slots $c\,c$, or may be fixed, if deemed best.

The wheel D is provided internally with gear-teeth, as in other reapers and mowers.

E is the cutter-bar. It is arranged on the front end of the platform in the usual manner. This bar is pivoted by its inner end to a horizontal vibrating lever, F, which has its fulcrum at the center of its length, and is attached at its extremity to a tranverse link, G, which turns in the path of a vertical circle at $d$, is jointed at $e$, and is swiveled at $f$.

H is a connecting-rod, with crank $g$ at its rear end. This rod is attached loosely by its crank end to the link G, and has a bevel-gear wheel, $h$, on its forward end. I is a shaft arranged, a little forward of the shaft D', on the frame C. This shaft is made adjustable by means of slots $j$ and set-screws $k$.

It is not necessary to have the shaft of the driving-wheel adjustable when the shaft of the pinion is made adjustable, and vice versa when the shaft D' is made adjustable. J is a pinion on the outer end of shaft I, and K is a bevel-wheel on the inner end of the same. The pinion gears either into the teeth of the driving-wheel or into a spur-wheel, D', on the shaft $D^2$, as presently described; and the large bevel-wheel K gears into the small bevel-wheel $h$.

M is a vertical adjusting-bar, attached to the front and inner end of the platform and passing up through a bracket, $l$, on the outside of the frame.

N is a lever arranged relatively to the bar M. This lever has a grooved semi-pulley, $m$, formed on its lower end and a semi-ratchet-wheel, $n$, attached to its inner side. $n'$ is a cord attached by one end to the bar M, and passing over the pulley of the lever, and being attached by its other end to the lever, as shown. $o$ is a spring-pawl, which locks the ratchet, and thus holds the platform at any elevation at which it may be adjusted.

O P are casters for supporting the frame and platform. The caster O is arranged on the rear of the frame, and P on the off side of the platform. The caster O stands at right angles with the frame, while that P stands oblique to a vertical line, when the platform is lowered for use, and owing to this its operation is peculiar, as will be evident from Fig. 6, it, by simply reversing its position, which it does whenever the machine is backed or turned, elevating the cutter-bar, and thus avoiding dragging.

Operation: The team is attached to the front end of the frame, the platform with cutter-bar adjusted to the proper height for cutting grain, the pinion J thrown in gear with the teeth of the large driving-wheel D, so as to give the cutter-bar a rapid speed. All being ready, the machine moves over the field, and as it does so the driving-wheel transmits the motion to the pinion J, from which it passes to the bevel-wheels $h$ K, and from them to the vibrating cutter-bar, by means of the intermediate connections, F G H. For mowing, the platform is lowered, the swivel $f$ allowing it to be thus adjusted. The small pinion J is thrown in gear with the large spur-wheel $D^2$, so as to slacken the speed suitably for mowing. This being done, the operation proceeds precisely the same as when cutting grain, excepting that whenever it is necessary to turn or back the cutter-bar is elevated by the caster, as illustrated in Fig. 6, when in which position it cannot possibly drag.

What I claim as my invention, and desire to secure by Letters Patent, is—

Operating the cutters of combined reaping and mowing machines by means of the intermediate pinion, J, in combination, with the internally-geared driving-wheel D and the spur-wheel $D^2$ on the driving-wheel shaft, when the same are constructed and arranged in relation to each other substantially as and for the purpose set forth.

CHS. CROOK.

Witnesses:
ROBT. W. FENWICK,
G. YORKE ATLEE.